US009843490B2

(12) United States Patent
Burch et al.

(10) Patent No.: US 9,843,490 B2
(45) Date of Patent: Dec. 12, 2017

(54) METHODS AND SYSTEMS FOR ANALYTIC CODE INJECTION

(71) Applicant: NetIQ Corporation, Provo, UT (US)

(72) Inventors: Lloyd Leon Burch, Payson, UT (US); Duane Fredrick Buss, West Mountain, UT (US)

(73) Assignee: NetIQ Corporation, Provo, UT (US)

( * ) Notice: Subject to any disclaimer, the term of this patent is extended or adjusted under 35 U.S.C. 154(b) by 250 days.

(21) Appl. No.: 13/803,365

(22) Filed: Mar. 14, 2013

(65) Prior Publication Data

US 2014/0280867 A1    Sep. 18, 2014

(51) Int. Cl.
*G06F 15/173* (2006.01)
*H04L 12/26* (2006.01)
*G06F 17/30* (2006.01)

(52) U.S. Cl.
CPC .......... *H04L 43/08* (2013.01); *G06F 17/3089* (2013.01)

(58) Field of Classification Search
CPC ........ G06F 17/30; H04L 67/025; G06Q 30/02
See application file for complete search history.

(56) References Cited

U.S. PATENT DOCUMENTS

| | | | |
|---|---|---|---|
| 8,234,370 B2 | 7/2012 | Hammer et al. | |
| 8,307,101 B1 | 11/2012 | Mui et al. | |
| 2007/0244650 A1* | 10/2007 | Gauthier | G06Q 10/10 702/19 |
| 2008/0209451 A1* | 8/2008 | Michels | G06F 15/16 719/328 |
| 2008/0275980 A1* | 11/2008 | Hansen | G06Q 30/02 709/224 |
| 2010/0023380 A1 | 1/2010 | Anderson | |
| 2010/0318976 A1 | 12/2010 | Everly et al. | |
| 2011/0022704 A1* | 1/2011 | Duan | G06F 17/30899 709/224 |
| 2011/0041171 A1* | 2/2011 | Burch | H04L 63/08 726/7 |
| 2011/0119100 A1* | 5/2011 | Ruhl | G06F 17/3089 705/7.11 |
| 2012/0005257 A1 | 1/2012 | Narayanan et al. | |
| 2012/0030276 A1 | 2/2012 | Narayanan et al. | |
| 2013/0060915 A1 | 3/2013 | Crook | |
| 2013/0132558 A1* | 5/2013 | Cyr | G06F 11/3495 709/224 |

(Continued)

OTHER PUBLICATIONS

Verma, Vishal. 'New Google Analytics code into external file'. From Stackoverflow.com [online]. Oct. 29, 2012 at 13:58 [retrieved on Nov. 12, 2015]. Retrieved from the Internet: <URL:http://stackoverflow.com/questions/3870345/newgoogleanalyticscodeintoexternalfile>.*

(Continued)

*Primary Examiner* — Kevin Bates
*Assistant Examiner* — Dae Kim
(74) *Attorney, Agent, or Firm* — Schwegman Lundberg & Woessner, P.A.

(57) ABSTRACT

Techniques for inserting analytic logic into network requests are presented. In an embodiment, instructions are dynamically inserted into web pages as the pages are requested. The instructions enable analytics to be captured and/or tracked when the web pages are processed. In another embodiment, web requests are intercepted and processed to include analytic instructions.

18 Claims, 5 Drawing Sheets

(56) References Cited

U.S. PATENT DOCUMENTS

| | | | | |
|---|---|---|---|---|
| 2013/0198376 | A1* | 8/2013 | Landa | G06Q 10/04 709/224 |
| 2014/0006482 | A1* | 1/2014 | Raghu | H04L 67/10 709/203 |
| 2014/0067520 | A1* | 3/2014 | Campanile | 705/14.42 |
| 2014/0215050 | A1* | 7/2014 | Lu | H04L 67/2804 709/224 |

OTHER PUBLICATIONS

'Piwik JavaScript tracking'. From Wayback Machine Internet Archive [online]. Jan. 2, 2012 [retrieved on Jun. 2, 2016]. Retrieved from the Internet: <URL:https://web.archive.org/web/20120102224354/http://piwik.org/docs/javascript-tracking/>.*

'Piwik: A Tour of Piwik'. From Wayback Machine Internet Archive [online]. Jan. 15, 2013 [retrieved on Jun. 2, 2016]. Retrieved from the Internet: <URL:https://web.archive.org/web/20130115142940/http://piwik.org/docs/piwik-tour/>.*

* cited by examiner

METHODS AND SYSTEMS FOR ANALYTIC CODE INJECTION

BACKGROUND

As the industry increases the use of mobile devices, access to enterprise services is occurring via platforms and devices not previously anticipated. This presents challenges with respect to data delivery and presentation because of the existing web pages deployed by the enterprise may not optimally permit viewing of information from the enterprise via small mobile screens. Additionally, enterprises want to monitor who is using their web services, what devices they are using, and how they are accessing those web services. One way to do this is to capture and track analytics for the enterprise services when the users access the services over the Internet.

In fact, being able to follow what users are doing with an enterprise's web services has always been an issue. There are a few vendors who have attempted to solve this by offering an analytical view of the web traffic to an enterprise system. Two industry leaders in this area are Google Analytics and OMNITURE (online marketing and web analytics). To gain the full advantage of these tools, the user needs to add small pieces of code to his/her web pages that report events to a remote analytical server. One of the problems with this is approach is that every page that an administrator wants to get analytical information for must be modified. This is a real problem and is a time consuming task to do even once for static pages, but is a much larger effort if the web pages need to be dynamic. Moreover, because a JavaScript is inserted at the time a Hypertext Markup Language (HTML) page is created, the script cannot be based on identity and/or other runtime acquired information. The other problem is that it is not always possible to insert a JavaScript into all types of Hypertext Transfer Protocol (HTTP) calls, REpresentational State Transfer (REST) calls are a significant example of this latter situation.

SUMMARY

Various embodiments of the invention provide techniques for injecting analytics into network requests. In an embodiment, a method for analytic injection is presented.

Specifically, web pages that are requested by a principal are intercepted. Next, analytic logic is selectively inserted into the web pages for capturing metrics related to access and use of the web pages by the principal. Finally, the metrics that are sent to an analytic server are controlled by the analytic logic when the web pages are accessed by the principal.

DETAILED DESCRIPTION

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1A:
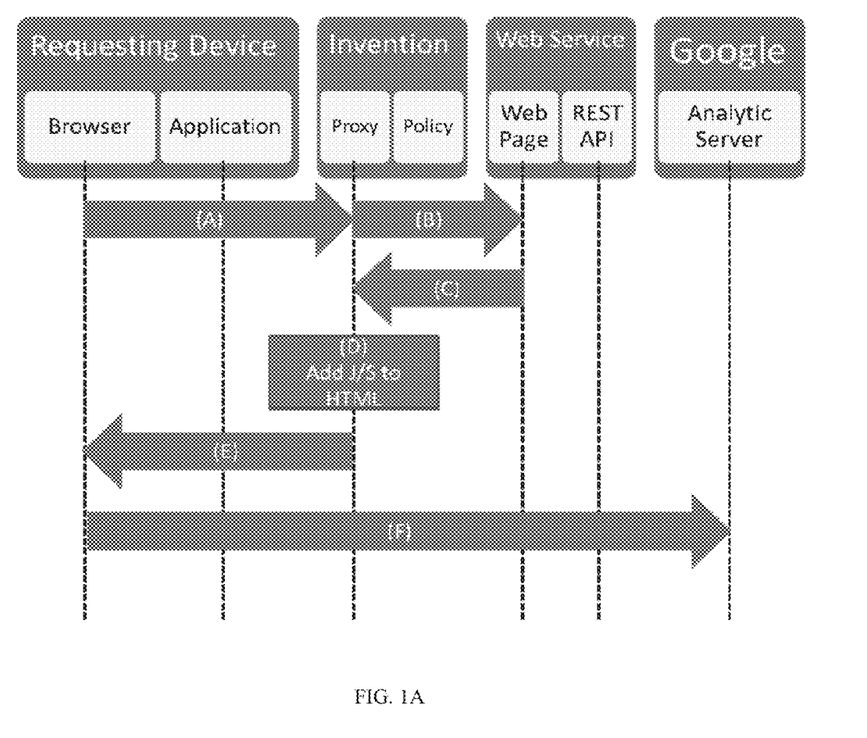
FIG. 1A is a diagram of a technique for inserting analytic logic into web requests, according to an example embodiment presented herein.
Figure 1B:
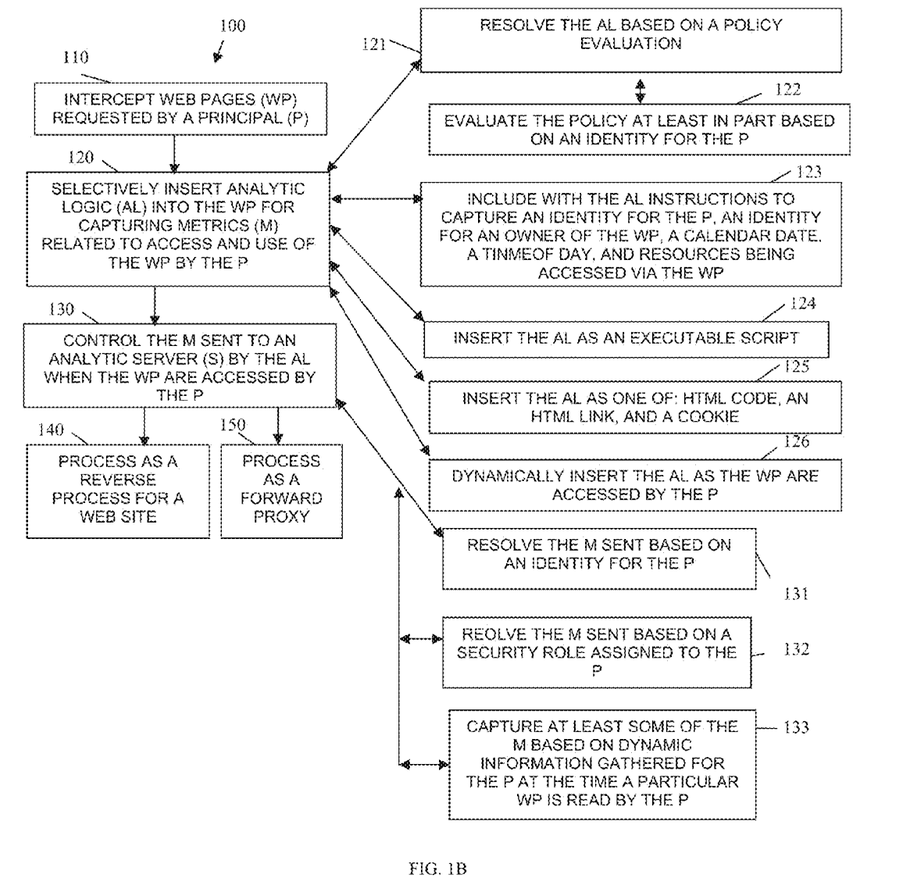
FIG. 1B is a diagram of a method for analytic injection using the technique presented in the FIG. 1A, according to an example embodiment presented herein.
Figure 2A:
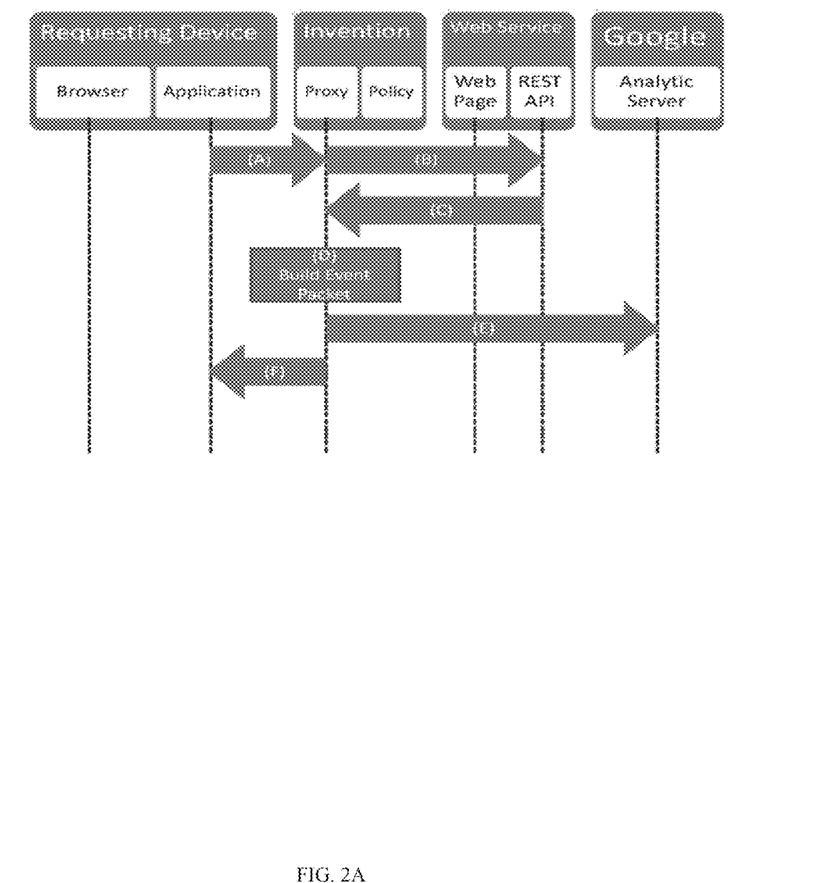
FIG. 2A is a diagram of a technique for inserting analytics into web requests by substituting the web requests, according to an example embodiment presented herein.
Figure 2B:
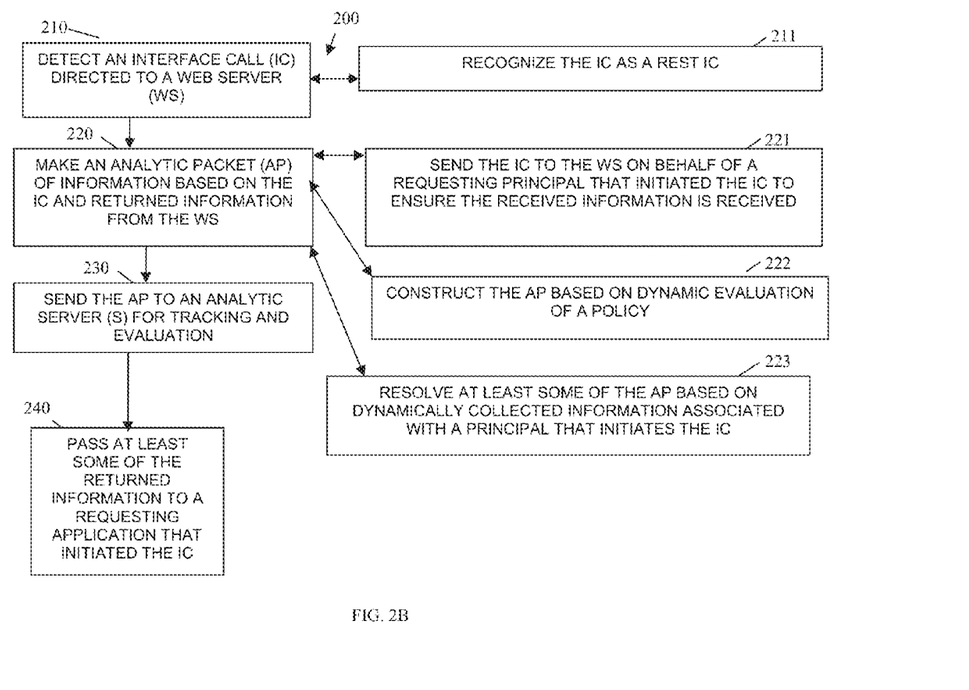
FIG. 2B is a diagram of a method for analytic injection using the technique presented in the FIG. 2A, according to an example embodiment presented herein.
Figure 3:
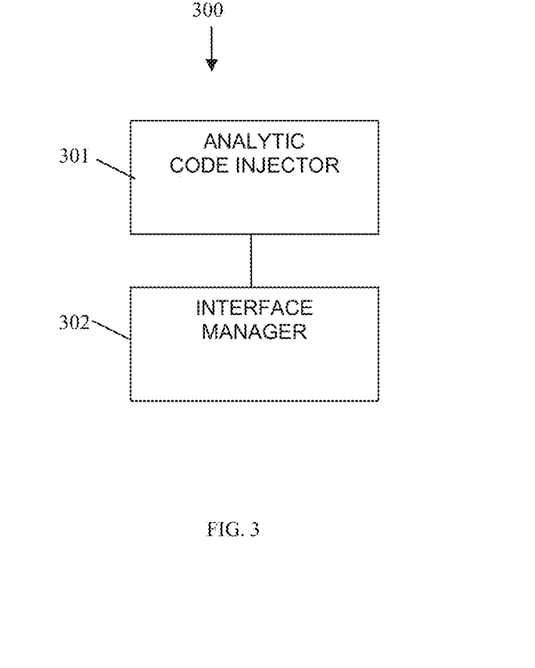
FIG. 3 is a diagram of analytic injection system, according to an example embodiment.

It is within this context that embodiments of the invention are now discussed within the context of the FIGS. 1-3.

FIG. 1A is a diagram of a technique for inserting analytic logic into web requests, according to an example embodiment presented herein. The technique is implemented and programmed as executable instructions within memory and/ or a non-transitory computer-readable storage medium for execution on one or more processors of a device.

Referencing the FIG. 1A, at A, the browser of a user requests a web page that is protected by a proxy. At B, the proxy allows the request to flow through to the web service page. At C, the web server returns an HTML page back to the proxy. At D, policy is used to inject a script into the HTML page, such as a JavaScript. At E, the modified page is sent to the browser and the browser displays that HTML. At F, the browser runs the injected script, which is designed to send one or more analytic packets to an analytic server.

The processing reflected by he FIG. 1A dynamically inserts an HTML block of code (software instructions), such as a JavaScript, an HTML link, or a cookie, into web pages as they are requested via a proxy. This provides value in two ways: 1) this is an automatic policy based process that does not require the rewriting any of the web pages or modifications made to any existing web pages of an enterprise on a static per page bases; and 2) the injection can be done dynamic at runtime and is not statically done at page creation time; dynamic rewriting at runtime. So, the approach allows an administrator to control how many and what kind of events are sent to an analytic server (such as a Google Analytic Server). This can be a cost saving, limiting the number of events that have to be captured and communicated and can also be used to improve security by only sending events on known groups or users. Because the events are dynamically injected by the proxy, event tracking can be enabled or disabled for specific users, roles, or other identity-based data. Moreover, because the proxy can "rewrite" the Uniform Resource Locator (URL), and URL is where information is obtained by the injected script, the proxy can control the data that is sent to the analytics server. This data can be any additional information set by the proxy at "page read time." This allows an administrator to now have user data, such as identity data, show up and be used as part of the analytic reports. This also adds a substantial enterprise value to the administrator by allowing him/her to not only see how many people used the enterprise site but also know what groups the people are in, or any other user data to the enterprise.

FIG. 1B is a diagram of a method 100 for analytic injection using the technique presented in the FIG. 1A, according to an example embodiment presented herein. The method 100 (herein after referred to as "analytic code injector") is implemented, programmed, and resides within memory and/or a non-transitory machine-readable storage medium that executes on one or more processors of a device and is operational over a network. The network may be wired, wireless, or a combination of wired and wireless, At 110, the analytic code injector intercepts web pages requested by a principal. The interception can occur via browser interactions. The browser can be associated with any device, including mobile devices, such as phones, tablets, laptops, wearable devices, and the like.

At 120, the analytic code injector selectively inserts analytic logic into the web pages for capturing metrics related to accessing and using of the web pages by the principal.

According to an embodiment, at 121, the analytic code injector resolves the analytic logic based on a policy evaluation. The policy used can be based on a variety of dynamically determined factors.

As one example, at 122, the analytic code injector evaluates the policy at least in part based on an identity for the principal.

In an embodiment, at 123, the analytic code injector includes with the analytic logic instructions to capture an identity for the principal, an identity for an owner of the web pages, a calendar date, a time of day, and resources being accessed via the web pages.

In another case, at 124, the analytic code injector inserts the analytic logic as an executable script.

In yet another situation, at 125, the analytic code injector inserts the analytic logic as one of: HTML code, an HTML link, and a cookie.

In an embodiment, at 126, the analytic code injector dynamically inserts the analytical logic as the web pages are accessed by the principal.

At 130, the analytic code injector controls the metrics sent to an analytical server by the analytical logic when the web pages are accessed by the principal.

According to an embodiment, at 131, the analytic code injector resolves the metrics sent based on an identity for the principal.

In another case, at 132, the analytic code injector resolves the metrics sent based on a security role assigned to the principal.

In still another situation, at 133, the analytic code injector captures at least some of the metrics based on dynamic information gathered for the principal at the time a particular web page is read by the principal.

According to an embodiment, at 140, the analytic code injector processes as a reverse proxy for the web site providing the web pages.

In another case, at 150, the analytic code injector processes as a forward proxy for the web site providing the web pages or for clients accessing the web pages.

FIG. 2A is a diagram of a technique for inserting analytics into web requests by substituting the web requests, according to an example embodiment presented herein. The technique is implemented and programmed as executable instructions within memory and/or a non-transitory computer-readable storage medium for execution on one or more processors of a device.

Referencing the FIG. 2A, at A, an application makes a REST call to a REST Application Programming Interface (API) web server, via the proxy. (It is noted that REST is not required but shown for purposes of illustration; other protocols/interfaces such as Simple Object Access Protocol (SOAP) can be used as well.) At B, the proxy forwards the request to the REST API. At C, the REST API returns a message (such as JavaScript Object Notation (JSON)). At D, the policy engine builds an analytical packet (such as a Google analytical packet), which may include simple URL information or detailed identity and security role data. At E, the analytical packet is sent to the analytical server. Finally, at F, the message is sent to the application.

The approach of the FIG. 2A can be used where it is not possible to inject any script or any other type of code in to the URL-based web page. This is a common problem if the URL request is a REST call. The techniques herein solve this situation by the proxy making an API call to the analytics server as an URL request and responses flow though the proxy. From the view of the analytic server it just sees an event and records it. The applications making and receiving the REST calls need not have any modification and all still works as normally planned.

FIG. 2B is a diagram of a method 200 for analytic injection using the technique presented in the FIG. 2A, according to an example embodiment presented herein. The method 200 (herein after referred to as "interface proxy") is implemented, programmed, and resides within memory and/ or a non-transitory machine-readable storage medium that executes on one or more processors of a device and is operational over a network. The network may be wired, wireless, or a combination of wired and wireless.

At 210, the interface proxy detects an interface call directed to a web server. This can be achieved as a reverse, forward, or in some cases a transparent proxy.

According to an embodiment, at 211, the interface proxy recognizes the interface call as a REST interface call.

At 220, the interface proxy makes an analytic packet of information based on the interface call and returned information from the web server.

In an embodiment, at 221, the interface proxy sends the interface call to the web server on behalf of a requesting principal that initiated the interface call to ensure the received information is received and processed by the interface proxy.

According to an embodiment, at 222, the interface proxy constructs the analytical packet of information based on dynamic evaluation of a policy.

In yet another case, at 223, the interface proxy resolves at least some of the analytical packet information based on dynamically collected information associated with a principal that initiates the interface call.

At 230, the interface proxy sends the analytical packet information to an analytic server for tracking and evaluation.

According to an embodiment, at 240, the interface proxy passes at least some of the returned information to a requesting application that initiated the interface call.

FIG. 3 is a diagram of analytic injection system 300, according to an example embodiment. The components of the mobile touch analytic injection system 300 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the analytic injection system 300 implements, inter alia, the features of the FIGS. 1A, 1B, 2A, and 2B.

The analytic injection system 300 includes an analytic code injector 301 and an interface manager 302. Each of these will be discussed in turn.

The analytic injection system 300 includes one or more devices having memory configured with the analytic code injector 301. Example processing associated with the analytic code injector 301 was presented above in detail with reference to the FIGS. 1A and 1B.

The analytic code injector 301 is configured to the analytic code injector is configured to dynamically inject analytic logic into web pages accessed by a principal.

The analytic injection system 300 also includes one or more device having memory configured with the interface manager 302. Example processing associated with the interface manager 302 was presented above in detail with reference to the FIGS. 2A and 2B.

The interface manager 302 is configured to create an analytic packet based on interface calls made by the principal.

The analytic logic and the analytic packet communicate metrics to an analytic server based on access of the principal to the web pages or a web server.

According to an embodiment, the interface calls are REST calls made by the principal to the web server.

It is now appreciated that the analytic code injector 301 and the interface manager 302 provide a variety of novel benefits including: 1) allowing analytics to be used without any HTML page modification; 2) allowing analytics to be dynamic and changed at "page viewing time" and not "page creation time;" 3) allowing a "codeless" analytical solution; 4) allowing policy driven analytical control; 5) allowing identity driven analytical control; and 6) allowing integrated analytical tracking across pages, interfaces and web apps, without the current client expectations and restrictions.

The above description is illustrative, and not restrictive. Many other embodiments will be apparent to those of skill in the art upon reviewing the above description. The scope of embodiments should therefore be determined with reference to the appended claims, along with the full scope of equivalents to which such dams are entitled.

The invention claimed is:

1. A method implemented and programmed within a non-transitory computer-readable storage medium and processed by a device configured to perform the method, comprising:

intercepting, by the device, web pages requested by a principal;

selectively, via the device, inserting analytic logic as an executable script into links associated with the web pages for capturing metrics related to access and use of the web pages by the principal, wherein inserting further includes inserting data with the executable script into the links where information obtained for executable script processing is acquired by the executable script from the data in the links, and wherein inserting further includes inserting the analytic logic without modification to any of the web pages and the web pages remain unchanged, and wherein inserting further includes inserting identity data as the data for the principal and group data for groups to which the principal belongs; and controlling, via the device, the metrics sent to an analytic server by the analytic logic when the web pages are accessed by the principal and identifying the metrics with the identity data and the group data, wherein controlling further includes selectively disabling the metrics sent to the analytic server based on specific users, security role data and the identity data.

2. The method of claim 1 further comprising, processing, via the device, the method as a reverse proxy for a web site.

3. The method of claim 1 further comprising, processing, via the device, a forward proxy.

4. The method of claim 1, wherein selectively inserting further includes resolving the analytic logic based on a policy evaluation.

5. The method of claim 4, wherein resolving further includes evaluating the policy at least in part based on an identity for the principal.

6. The method of claim 1, wherein selectively inserting further includes including with the analytic logic instructions to capture an identity for the principal, an identity for an owner of the web pages, a calendar date, a time of day, and resources being accessed via the web pages.

7. The method of claim 1, wherein selectively inserting further includes dynamically inserting the analytic logic as the web pages are accessed by the principal.

8. The method of claim 1, wherein controlling further includes resolving the metrics sent based on an identity for the principal.

9. The method of claim 1, wherein controlling further includes resolving the metrics sent based on a security role assigned to the principal.

10. The method of claim 1, wherein controlling further includes capturing at least some of the metrics based on dynamic information gathered for the principal at the time a particular web page is read by the principal.

11. A method implemented and programmed within a non-transitory computer-readable storage medium and processed by a device configured to perform the method, comprising:

detecting, at the device, an interface call directed to a web server when the interface call is incapable of being modified, wherein detecting further includes identifying the interface call as being sent by a requesting principal;

making, at the device, an analytic packet of information based on the interface call and returned information from the web server, wherein making further includes building the analytic packet with identity and security role data and wherein making further includes obtaining the identity and security role data from the interface call and the identity and security role data for the requesting principal; and sending, from the device, the analytic packet of information to an analytic server for tracking and evaluation, wherein sending further includes selectively preventing the analytic packet from being sent to the analytic server based on specific users, the identity and security role data.

12. The method of claim 11, further comprising, passing at least some of the returned information to a requesting application that initiated the interface call.

13. The method of claim 11, wherein detecting further includes recognizing the interface call as a REpresentational State Transfer (REST) interface call.

14. The method of claim 11, wherein making further includes sending the interface call to the web server on behalf of the requesting principal that initiated the interface call to ensure the received information is received.

15. The method of claim 11, wherein making further includes constructing the analytical packet of information based on dynamic evaluation of a policy.

16. The method of claim 11, wherein making further includes resolving at least some of the analytical packet of information based on dynamically collected information associated with the requesting principal that initiates the interface call.

17. A system, comprising:

a memory configured with an analytic code injector that processes on one or more processors of a device;

the memory configured with an interface manager that processes on the one or more processors of the device wherein the analytic code injector is configured to dynamically inject analytic logic into web pages accessed by a principal, the interface manager is configured to create an analytic packet based on interface calls made by the principal when the interface calls are incapable of being modified and the web pages remain unchanged, and the analytic packet built with security and role data for the principal and obtained from the interface call, and wherein the analytic logic and the analytic packet communicate metrics to an analytic server based on access of the principal to the web pages or a web server, and wherein the metrics are selectively not communicated to the analytic server based on specific users, identity data, and the security and role data.

18. The system of claim 17, wherein the interface calls are REpresentational State Transfer (REST) calls made by the principal to the web server.

* * * * *